Figure 1:
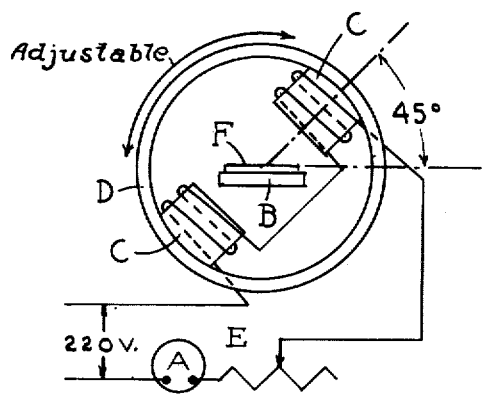

Oct. 9, 1951  B. C. PRATT ET AL  2,570,856
PROCESS FOR OBTAINING PIGMENTED FILMS
Filed March 25, 1947

Inventors
Burt Carlton Pratt
Paul L. Salzberg
By R. F. Miller
Attorney

Patented Oct. 9, 1951

2,570,856

UNITED STATES PATENT OFFICE 2,570,856

PROCESS FOR OBTAINING PIGMENTED FILMS

Burt Carlton Pratt and Paul L. Salzberg, Wilmington, Del., assignors to E. I. du Pont de Nemours & Company, Wilmington, Del., a corporation of Delaware Application March 25, 1947, Serial No. 737,178

7 Claims. (Cl. 41—32)

1

This invention relates to films or sheets containing metallic flake pigments. More particularly, it relates to a process for orienting magnetic flakes in films or sheets containing them.

This application is a continuation-in-part of our copending application, Serial No. 522,666, filed February 16, 1944, now issued as U. S. Patent 2,418,479.

Paints containing metallic flakes as the pigment give bright opaque coatings when they are applied to a surface by conventional means, such as brushing, spraying, knifing and the like. The resulting brightness in the film is caused by the orientation or "leafing" of the flakes in the film, by which is meant that a large proportion of the flakes all lie in the same direction and in a plane parallel to the plane of the film rather than in all directions at random. In general, the brightness of such a film is proportional to the degree of orientation of the metallic flakes in the plane of film. This brightness and opaqueness are desirable qualities in metallic paint films employed in certain application, but in others they are serious disadvantages, especially in obtaining certain artistic effects. However, the conventional methods of producing films are capable of producing orientation of the metallic flakes only in a plane parallel to the plane of the film. Hence they are incapable of producing metal flake pigmented films of low degrees of brightness or reflectance, or which are transparent.

This invention has as an object a new process for orienting metallic flakes in paint films. A further object is to provide an orienting or leafing process involving no mechanical treatment of the paint film. Another object is to provide metallic paint films having a high degree of orientation and a low degree of brightness. A still further object is the production of metallic flake-pigmented films exhibiting unusual reflectance and translucency effects, and other novel properties. Other objects will appear hereinafter.

The above objects are accomplished by subjecting a soft film containing metal particles, at least 50% of which are in flake form and at least 10% of which are ferromagnetic, to the action of a magnetic field with the plane of the film at an angle of between 20° and 75° with the plane of the magnetic field, and maintaining the film in the magnetic field until it has dried sufficiently to permit removal of the film from the field without causing deorientation of the metal flake particles.

2

Films prepared in a preferred embodiment of this invention, in which the metallic flakes are oriented at an angle of between 20° and 75° to the plane of the film, have an unusually attractive two-tone appearance, that is, such films when viewed from one direction are very bright but when viewed from another direction are dull and non-reflecting. Such films are also translucent in one direction but not in others.

Apparatus suitable for carrying out this invention is shown in the drawing, in which Figure 1 is a diagrammatic view shown in elevation of a form of apparatus suitable for producing orientation of the metal flakes at any angle to the plane of the film.

In the embodiment shown in Figure 1, the apparatus consists of two electromagnets C mounted on opposite sides of the interior of an iron ring D which is mounted so that it can be adjusted to produce a magnetic field having a direction at an angle to the supporting surface B. This angle is shown as 45° in Figure 1. The magnets are actuated by 220 volt direct current. A rheostat E is inserted in the line to control the current which is read on ammeter A. The support B is mounted between the two magnets in such a way that a film F placed thereon will be horizontal and approximately in the center of the magnetic field.

The apparatus shown in Figure 2, which is a diagrammatic view shown in plan, is illustrative of a type which causes orientation of the metal flake in a plane parallel to the plane of the film, and which is advantageously employed prior to subjecting the film to the angular orienting procedure for the pigment described in connection with Figure 1 in the drawing. In this apparatus the arrangement of parts is the same as in Figure 1 with the exception that the table B carrying the film is mounted for the rotation of the film in the plane of the magnetic field.

The preferred mode of operation is to prepare a metallic flake-pigmented paint in the usual way, make a film therefrom by any method such as by knife coating, spinning, brushing, or spraying on a suitable support, and then transfer the supported wet paint film immediately to the apparatus illustrated in Figure 1 of the drawing. The current is passed through the coils of the electromagnet so as to produce a field strength sufficient to effect orientation but insufficient to cause the metal particles to extend appreciably beyond the surface of the film. The wet or soft film is maintained in the magnetic field until the paint has become dry enough or hard enough to permit its removal from the field without causing deorientation of the metal flakes. The paint may be further air-dried or baked in order to put it into condition for practical use.

Figure 2:
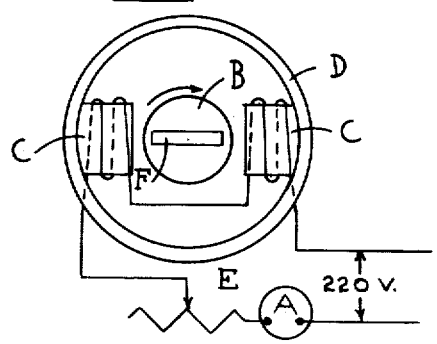

In a special embodiment of this mode of operation, the metal flakes in the wet paint film are first oriented in a plane parallel to the plane of the film by rotating the film applied to a non-magnetic base in the plane of the magnetic field by apparatus such as that shown in Figure 2 and described in our above identified application, and then stopping the rotation while the film is still soft and changing the direction of the magnetic field, by means of the apparatus shown in Figure 1, to an angle of from 20° to 75° to the plane of the film and maintaining the soft film in this latter position until it has dried enough to permit its removal from the magnetic field without causing deorientation of the metal flakes. This embodiment provides the maximum orientation of metal flakes at the desired angle to the plane of the film.

Another mode of operation consists in passing a plastic composition through heated rolls to form a soft, supported or unsupported film or sheet of any desired thickness, and then subjecting the resulting soft sheet or film to an electromagnetic field at an angle of from 20° to 75° to the plane of the film until the film has dried or set up enough to permit its removal from the magnetic field without causing deorientation of the metal flakes.

The methods for carrying out this invention include continuous methods as well as batch methods and methods in which the orientation is obtained concurrently with the formation of the film. Thus, films prepared by extrusion, calendering, or machine spraying can be passed continuously through a magnetic field maintained at the desired angle to the plane of the film. In these continuous methods it is essential that the composition of the metal pigmented paint or plastic vehicle, and the operating conditions, e. g., temperature and speed of motion through the magnetic field, be chosen so that the film or sheet is soft enough for the metal flakes therein to be oriented during the passage through the magnetic field and so that the composition dries or sets up fast enough so that the metal flakes do not become deoriented after they have left the influence of the magnetic field.

The invention is illustrated by the following examples in which parts are by weight.

*Example I*

A paint consisting of 0.88 part of finely divided nickel flakes uniformly dispersed in a solution of 6 parts of polystyrene, and 2 parts of the chlorinated hydrocarbon known commercially as "Aroclor 1254" in 18 parts of toluene is spread on the surface of a flat steel panel by means of a spreader knife set at 25 mils clearance. The steel panel with the wet film is placed between the poles of a magnet arranged as in Figure 1, so that the magnetic field is at an angle of about 45° to the plane of the support. The electric current is turned on and at the end of one-half hour the film has set up sufficiently for it to be removed from the magnetic field without deorientation of the nickel flakes. After drying completely at room temperature, the resulting film exhibits a two-tone effect depending on the position from which the film is viewed. When the film is observed from a point in a plane perpendicular to the direction in which the flakes are oriented, the film appears bright and metallic. However, when viewed from a point in a plane parallel to the direction of orientation of the flakes, the film appears dark and non-reflective. When viewed from an acute angle and the film is rotated through 180° in the plane of its surface, the appearance of the film changes continuously from a bright, metallic appearance to a dark, non-reflective appearance. The orientation of the metal flakes in this film also makes the film translucent or opaque depending on the position of the film. That is, when the film is stripped from the metal base it is translucent when viewed in the same direction in which the flakes are oriented, but opaque when viewed in a direction different from that in which the flakes are oriented.

*Example II*

Ten parts of a conventional alkyd resin paint containing 33% of oil-modified alkyd resin, 10.4% of flushed, transparent-type iron oxide, 2.2% of phenol-formaldehyde resin, 2% of conventional lead, manganese and cobalt driers, and 52.4% of aromatic hydrocarbon thinners are mixed thoroughly with 0.1 part of finely divided nickel flake pigment. The resulting paint is brushed on a glass plate, which is placed immediately in position between the poles of an electromagnet arranged at an angle of 65° to the plane of the film. After drying for one-half hour in this position with the electric current passing through the coils of the magnet, the film is removed. The resulting film, containing nickel flakes amounting to 3% of the weight of the alkyd resin binder, and in which the flakes are oriented at an angle of about 65° to the plane of the film, has an appearance varying from bright and metallic, to dull, dark brown, depending on the position from which it is viewed.

*Example III*

The paint composition of Example I is spread in a film 25 mils thick on a glass plate by the procedure of that example. The plate with the wet film is placed immediately between the poles of a magnet arranged so that the magnetic field is at an angle of 20° to the plane of the film, and the electric current turned on for one-half hour. The resulting film has a more pronounced two-tone effect than similar films in which the nickel flakes are oriented at angles greater or smaller than 20°

*Example IV*

A paint consisting of 0.22 part of finely divided nickel flakes, and 0.66 part of finely divided aluminum flakes uniformly dispersed in a solution of 6 parts of polystyrene and 2 parts of "Aroclor 1254" in 18 parts of toluene is spread into a 25 mil film on a glass plate. The plate and wet film is immediately exposed to a magnetic field at an angle of 45° to the plane of the film for one-half hour as in Example I. The resulting film, containing 10% metal flake pigment of which only one-fourth is ferromagnetic metal and the remainder is non-magnetic, exhibits a definite two-tone effect of the same type as described in the previous examples.

The process of this invention can be carried out with any metal-pigmented liquid paint composition or soft plastic composition in which at least 50% of the metal pigment is in flake form, and in which at least 10% of the metal pigment is ferromagnetic. Specific examples of ferromagnetic pigments useful in this invention are iron, iron alloys, steel, alloy steels, magnetic iron oxide, and the like. Non-ferromagnetic pigments such as aluminum, copper, bronze, silver, gold, etc., in flake form are also suitable for use in the process of this invention when used in combination with a ferromagnetic pigment in the proportions defined above. In these mixed pigments, the ferromagnetic pigment and non-ferromagnetic pigment must be in intimate contact, although it is not necessary that one type of pigment be coated on the the other type When using such mixed pigments, there should be sufficient ferromagnetic pigment present to render the mixture responsive to the action of a magnet of practical field strength. For practical purposes this means that the total pigment should contain at least about 10% by weight of the ferromagnetic pigment. Preferably 25% of ferromagnetic pigment is used as this amount gives more pronounced decorative effects than smaller amounts. When magnetic iron oxide is used as the ferromagnetic component in the practice of this invention, special methods for its dispersal in the film-forming binder must be employed since it is not in flake form. Suitable methods for doing this include those used in the paint industry for the mechanical dispersion of pigment particles, such as mixing in ball mills, roller mills and the like.

The concentration of metal pigment in paint or plastic compositions useful in the process of this invention can vary over wide limits. In general, the metal pigment or pigment mixture can range from as little as 0.1% to as much as 95% of the weight of the film binder in the paint. The exact numerical upper limit of the metal pigment concentration depends on the particular film-forming binder being employed, and should be not so much that the resulting film has insufficient strength to be self supporting. For producing films having the more pronounced two-tone effect, it is preferred to employ the lower concentrations of metal pigment, i. e., from 1% to 25% metal pigment based on the weight of the film-forming binder.

While films having metal flakes oriented at any angle between 20° and 75° to the plane of the film exhibit the two-tone effects mentioned previously, they exhibit them to different degrees varying with the particular angles of orientation of the metal flakes in the films. The most pronounced difference in brightness exhibited by films rotated in their plane through 180° is shown by those films in which the metal flakes are oriented at an angle of about 20° to the plane of the film.

In the orientation in a film of pigment particles so that they lie with their broad faces parallel to the surface of the film, a form of orientation effected by the process claimed in applicants' aforementioned U. S. Patent 2,418,479, the pigment particles are oriented substantially in a single plane, such plane being parallel to the plane of the film. However, when pigment particles in flake form are oriented in a film at an angle to the plane of the film as in the present invention, they obviously are not oriented in a plane at all but rather with a major axis of each flake-like particle lying parallel to a major axis of each other flake-like particle, these major axes all being parallel to the magnetic field which has caused the orientation. By "major axis" is meant any axis or line lying in the plane of the two broad parallel faces of the flake-like particle. It is not material whether the longest major axis of each particle is parallel to the magnetic field so long as a major axis is; although, if the flake-like particle is ferromagnetic, it will orient with its magnetic axis parallel to the magnetic field and it is known that the magnetic coincides with the longest major axis, or one of the longest if there are several major axes of equal length.

The method described herein is applicable to compositions comprising any desired film-forming binder examples of which are drying oils, varnishes, various alkyd resins, polyvinyl chloride interpolymers, polyisobutylene, polyethylene, cellulose and cellulose derivatives such as regenerated cellulose, ethylcellulose, cellulose acetate and nitrocellulose, amide-formaldehyde resins, polyvinyl alcohol, polystyrene, etc. The binder may contain other ingredients such as plasticizers, fillers, dispersing agents, non-metallic pigments, dyes, etc. For practical purposes, it is desirable that the paint have a viscosity of at least 0.3 poise at 25° C.

The strength of the magnetic field used in the process of this invention may be varied considerably, depending, among other things, on the amount and kind of ferromagnetic pigment in the total pigment mixture and on the viscosity of the vehicle. Some effect is obtained with a field strength as low as 5 gauss. In general, a field strength of 100 to 500 gauss is sufficient to orient the flakes even in vehicles of rather high viscosity. The field strength should not exceed that at which the entire paint composition begins to be attracted toward the magnet, although the latter effect, if it takes place, may be offset by applying the magnetic field intermittently. The field strength is preferably held below that at which a rough film is formed. In general, it may be said that, the less magnetic pigment there is in the total pigment, or the more viscous the vehicle is, the higher the field strength should be.

This invention is applicable to the treatment of unsupported films or sheeting, or films on any desired support, either non-magnetic or magnetic, such as paper, cardboard, regenerated cellulose, cloth, earthenware, wood, fabrics of any kind, sheet metal, etc. It is also applicable to the treatment of film on either flat or curved supports, or treatment of objects of any desired shape such as rods, tubes, etc. In the case of films on curved supports, novel decorative effects are obtained since the metal pigment will be oriented in different directions in the film due to the different angles between the magnetic field and the surface of the film at different points throughout its area.

As many apparently widely different embodiments of this invention may be made without departing from the spirit and scope thereof, it is to be understood that we do not limit ourselves to the specific embodiments thereof except as defined in the appended claims.

We claim:

1. A metal-pigmented film comprising a film-forming binder and from 0.1% to 95%, by weight of said binder, of metal pigment particles, at least 50% of said metal particles being in flake form and at least 10% of said metal particles being ferromagnetic, said metal particles in flake form being oriented so that a major axis of each of said particles in flake form is parallel to a major axis of each other of said particles in flake form, said parallel major axes being at an angle of 28° to 75° to the plane of said film.

2. A metal-pigmented film as defined in claim 1 wherein said metal pigment particles are present in an amount of 1% to 25% by weight of said binder and said parallel major axes are at an angle of 20° to 75° to the plane of the film.

3. A metal-pigmented film comprising a film-forming binder and from 0.1% to 95%, by weight of said binder, of metal pigment particles, said metal particles being substantially all in flake form and ferromagnetic and oriented so that the magnetic axes of said metal particles are parallel and are at an angle of 20° to 75° to the plane of the film.

4. A metal-pigmented film as defined in claim 3 wherein said metal pigment particles are present in an amount of 1% to 25% by weight of said binder and said parallel magnetic axes are at an angle of 20° to 75° to the plane of the film.

5. A metal-pigmented film comprising an alkyd resin binder and from 1% to 25%, by weight of said binder, of nickel pigment particles, said nickel particles being substantially all in flake form and oriented so that the magnetic axes of said particles are parallel and are at an angle of 20° to 75° to the plane of the film.

6. A metal-pigmented film as defined in claim 5 wherein said parallel magnetic axes of said particles are at an angle of about 20° to the plane of the film.

7. A metal-pigmented film comprising a polystyrene binder and from 1% to 25%, by weight of said binder, of nickel pigment particles, said nickel particles being substantially all in flake form and oriented so that the magnetic axes of said particles are parallel and are at an angle of 20° to 75° to the plane of the film.

BURT CARLTON PRATT.
PAUL L. SALZBERG.

REFERENCES CITED

The following references are of record in the file of this patent:

UNITED STATES PATENTS

| Number | Name | Date |
| --- | --- | --- |
| 1,918,848 | Land et al. | July 18, 1933 |
| 1,930,788 | Buekner | Oct. 17, 1933 |
| 2,017,705 | Sproxton | Oct. 15, 1935 |
| 2,199,526 | McCowen | May 7, 1940 |
| 2,302,305 | Farrell | Nov. 17, 1942 |
| 2,418,479 | Pratt | Apr. 8, 1947 |

Certificate of Correction

Patent No. 2,570,856 — October 9, 1951

BURT CARLTON PRATT ET AL.

It is hereby certified that error appears in the printed specification of the above numbered patent requiring correction as follows:

Column 5, lines 52 to 57, beginning with "The most" strike out all to and including "the film."; column 6, line 74, for "28°" read *20°*; and that the said Letters Patent should be read as corrected above, so that the same may conform to the record of the case in the Patent Office.

Signed and sealed this 5th day of February, A. D. 1952.

[SEAL]

THOMAS F. MURPHY,
*Assistant Commissioner of Patents.*